United States Patent [19]

Fling et al.

[11] Patent Number: 4,602,276

[45] Date of Patent: Jul. 22, 1986

[54] DIGITAL SIGNAL LEVEL OVERLOAD SYSTEM

[75] Inventors: Russell T. Fling, Noblesville; Donald H. Willis; David L. McNeely, both of Indianapolis, all of Ind.

[73] Assignee: RCA Corporation, Princeton, N.J.

[21] Appl. No.: 599,531

[22] Filed: Apr. 12, 1984

[51] Int. Cl.$^4$ .............................. H04N 9/68
[52] U.S. Cl. ........................................ 358/27
[58] Field of Search ............................ 358/27

[56] References Cited

U.S. PATENT DOCUMENTS

| | | | |
|---|---|---|---|
| 3,764,734 | 10/1973 | Srivastava et al. | 178/5.4 |
| 3,943,560 | 3/1976 | Freestone | 358/27 |
| 3,967,313 | 6/1976 | Miyamoto | 358/27 |
| 4,106,054 | 8/1978 | Tzakis | 358/27 |
| 4,106,055 | 8/1978 | Burdick et al. | 358/27 |
| 4,183,047 | 1/1980 | Kim et al. | 358/27 |
| 4,349,834 | 9/1982 | Tonomura et al. | 358/27 |
| 4,447,826 | 5/1984 | Lewis | 358/27 |
| 4,510,521 | 4/1985 | Ruprecht | 358/27 |
| 4,523,223 | 6/1985 | Lüder | 358/27 |
| 4,538,178 | 8/1985 | Bolger | 358/166 |
| 4,539,583 | 9/1985 | Flamm | 358/27 |

*Primary Examiner*—Michael A. Masinick
*Attorney, Agent, or Firm*—E. M. Whitacre; P. J. Rasmussen; E. P. Herrmann

[57] ABSTRACT

A signal overload circuit for use in e.g. a digital TV receiver includes a piecewise linear weighting circuit which weights samples of greater magnitude proportionately more heavily than samples of lesser magnitude. The weighted samples are applied to an accumulator, and the accumulated value over a field interval is compared to an overload reference value to generate an overload output signal which is combined with other gain factors for application as the common gain control signal to a common amplifier. The overload detector is coupled in a feedback loop around the common amplifier. In order not to defeat the function of the other gain factors, the overload detector is programmable and its sensitivity is made responsive to the other gain factors.

14 Claims, 5 Drawing Figures

4,602,276

DIGITAL SIGNAL LEVEL OVERLOAD SYSTEM

This invention relates to circuitry for processing video signals and more particularly to circuitry for limiting the maximum range of the processed signal.

BACKGROUND OF THE INVENTION

The present invention will be described in the context of chrominance signal processing in a television receiver though it is not limited to this application. In a television receiver, received video signal is separated into luminance and chrominance components. These components are processed separately and then recombined to produce R, G and B signals to drive an image display device.

The chrominance component includes, in sequential format, a synchronizing color burst followed by chrominance image formation. The amplitude of the color burst and the ratio of the amplitude of the color burst to the amplitude of the image formation is generally fixed by convention. Not infrequently, the magnitude of the color burst (and the image information) of the received signal deviates from the desired level due to faulty broadcast equipment or the transmission medium etc. To compensate for these deviations and restore the chrominance signal to nominal levels, conventional receivers include automatic chrominance control (ACC) circuits. The ACC circuits compare the burst magnitude to a preset reference and amplify or attenuate the chrominance signal to maintain the burst signal amplitude constant at the desired level.

It happens, due to faulty ACC operation or differential color burst image information deviations, that the ACC circuit raises the chrominance signal magnitude undesirably high. The effect of this is to reproduce images with excessively bright colors. To compensate for this latter contingency, chroma overload circuitry is provided which monitors the chrominance signal downstream from the ACC circuitry, and attenuates the chrominance signal when its magnitude exceeds a predetermined amplitude. In conventional analog receivers, the chroma overload function may be implemented with a simple gain controlled amplifier to provide the signal attenuation and a diode and low pass filter to provide detection.

Now consider a receiver which processes video signals digitally, i.e. using binary arithmetic. In a digital receiver gain/attenuation implies multiplication, and binary multipliers are relatively large, expensive devices and are to be avoided. Secondly, there is no binary device which performs a nonlinear function corresponding to a diode detector. And finally, it may not be possible to access the chrominance signal at a point in the signal path where it is most appropriate to perform chroma overload protection.

SUMMARY OF THE INVENTION

The present invention is a digital signal overload compensation circuit. The circuit includes a piecewise linear detection function which averages the signal level over a field period to produce a control signal. The control signal is arranged to modify the gain factor of a pre-existing signal multiplier circuit operating on the processed signal. In one embodiment the multiplier circuit is a chrominance signal saturation multiplier. In this embodiment the detector monitors the saturation multiplier output signal, and the detector output signal modifies the saturation gain factor. The detector is made programmable to accomodate user controlled changes of the saturation factor.

The chrominance overload detector includes a signal weighting circuit and a signal averaging circuit. The averaging circuit generates a signal corresponding to the average of the weighted signals over a field period. The average is then applied as an overload control signal. The weighting circuit is arranged to weight larger amplitude signals more heavily than smaller amplitude signals. This circuit includes a reference generator which provides a signal value, $X_R$, distinguishing the smaller from the larger amplitude signals. This value is subtracted from the applied signal samples, $X_n$, and the positive differences are applied to a first scaling circuit, to generate sample values $(S2-S1)(X_n-X_R)_P$ where $S2-S1$ is the scaling factor and $(X_n-X_R)_P$ designates only positive values of $X_n-X_R$. The applied signals $X_n$ are also applied to a second scaling circuit which develops the signal samples $S1 X_n$ where $S1$ equals a second scale factor. The scaled samples are then summed to generate the signal samples $Y_n$ defined by the equation $$Y_n = S1 X_n + (S2-S1)(X_n-X_R)_P$$

which samples are applied to the averaging circuit. The weighting circuit is programmed by changing the reference values $X_R$.

DETAILED DESCRIPTION

Figure 1:
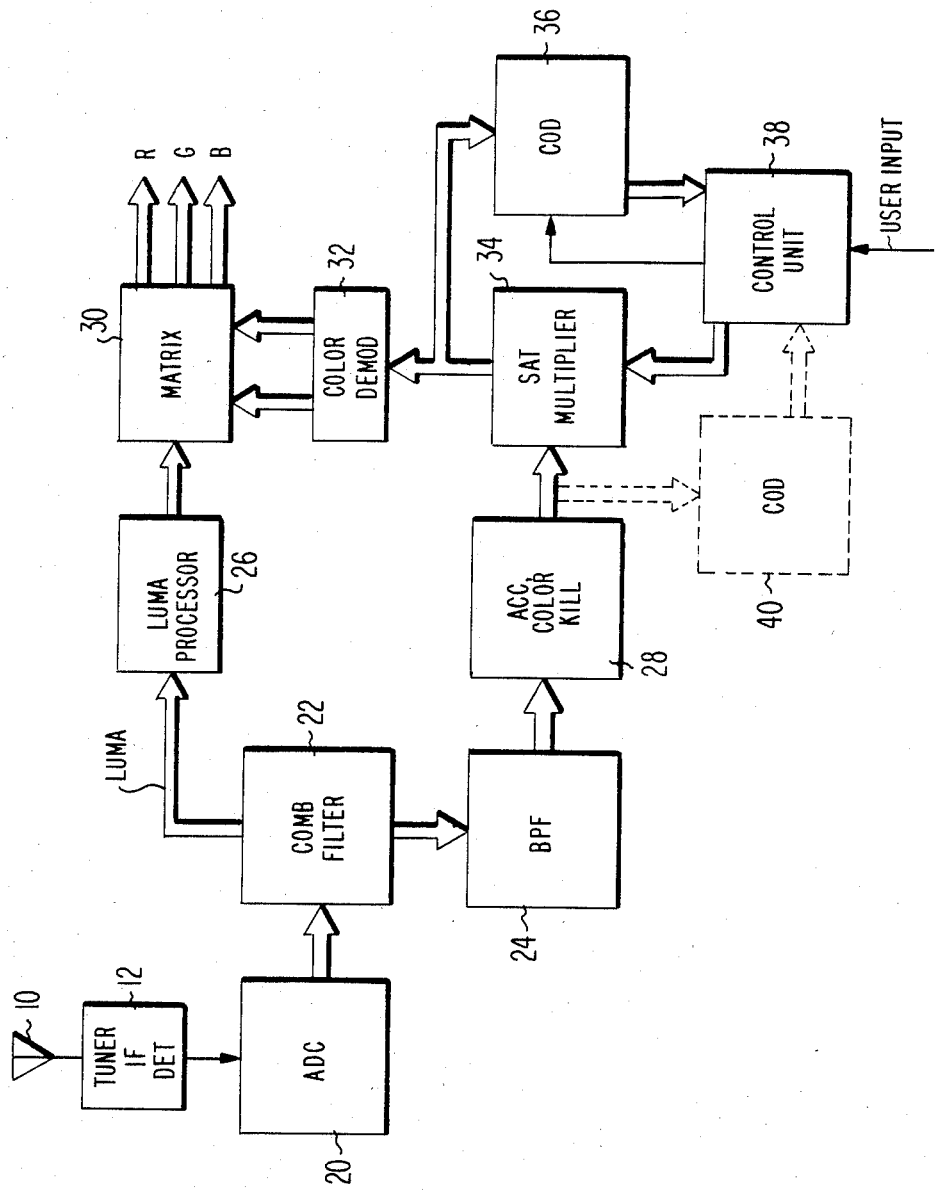
FIG. 1 is a block diagram of a portion of a digital television receiver including a signal overload control circuit in the chrominance signal processing path.

In the following description it will be assumed that the digital signals are in binary two's complement parallel bit form. The broad connections between elements in the drawings are parallel bit buses to accomodate the parallel bit samples, and the narrow connecting lines imply single line connections. Elements designated with like numerals in the different figures perform like functions.

FIG. 1 illustrates the basic signal processing blocks of a digital television receiver. In such a receiver conventional analog TV broadcast signals are received by antenna 10 and applied to a conventional analog tuner-IF circuit 12. Circuit 12 provides an analog baseband composite video signal which is applied to an analog-to-digital converter (ADC) 20. ADC 20 generates digital representations of the analog video signal at a rate of e.g. four times the color subcarrier frequency. The digital video samples are applied to comb filter 22 which separates the luminance and chrominance components of the composite video signal. The luminance component is applied to the luminance signal processing element 26 which may, for example, include low pass filters, signal peaking circuitry, contrast control, etc. Processed luminance signal from element 26 is applied to a matrixing circuit 30 wherein it is combined with processed chrominance signal to develop RED, GREEN and BLUE signals for driving an image display tube.

The chrominance component from comb filter 22 is applied to the bandpass filter 24 which eliminates low frequency noise and cross chrominance. Bandpass filtered chrominance signal is applied to the ACC-COLOR KILLER circuit 28 which adjusts the amplitude of the chrominance signal to maintain the amplitude of color burst constant. Alternatively, if the amplitude of the chrominance signal falls below a predetermined acceptable level, circuit 28 outputs a zero valued chrominance signal.

Chrominance signal from ACC circuit 28 is applied to the SATURATION MULTIPLIER 34 wherein the signal samples are scaled to adjust the reproduced image color intensity to the viewers preference. Output samples from multiplier 34 are applied to color demodulator circuit 32 which demodulates the chrominance signal to e.g. its quadrature related color difference signals (R−Y) and (B−Y). The color difference signals are applied to matrix circuit 30. Note that the relative positions of the saturation multiplier 34 and demodulator 32 may be interchanged.

Those skilled in the art of digital receivers will realize that the majority of the signal processing elements in a digital receiver operate under the control of a central control unit. For convenience, in FIG. 1 the control unit is shown coupled to the saturation multiplier 34 only. The control unit in this instance accepts user input saturation control signals and converts them to a format acceptable to multiplier 34.

In FIG. 1 there is also a signal level control element or chroma overload detector (COD) 36 coupled to the output of multiplier 34. COD 36 generates a signal related to the average value of the chrominance signal for a field/frame interval, which average signal is applied to the control unit 38. Responsive to this average value the control unit 38 readjusts the saturation scale factor applied to multiplier 34 to hold the average image color saturation or intensity to the viewers preferred setting.

An alternative COD arrangement is indicated by block 40 drawn in phantom wherein the chrominance signal is monitored ahead of the saturation multiplier 38. In this arrangement the COD does not tend to counteract user applied saturation changes. In this and the other COD arrangement the signal overload system incorporates a pre-existing signal multiplier (e.g. element 34) to minimize additional parts required to implement the function.

It is preferable to connect the COD circuit ahead of the multiplier because the detector may be designed with a fixed detection function rather than a programmable function as in the case of COD 36. However, the TV designer may not have access to the input connection of the saturation multiplier. For example, if the TV receiver is designed around the Digit 2000 VLSI digital TV processing circuits produced by ITT Intermetall, Freiburg, W. Germany, the designer will only have access to the saturation multiplier output signal and indirectly to the multiplier scale factor input through the control unit. In this instance the designer is forced to implement the COD function according to the arrangement with element 36.

Figure 2:
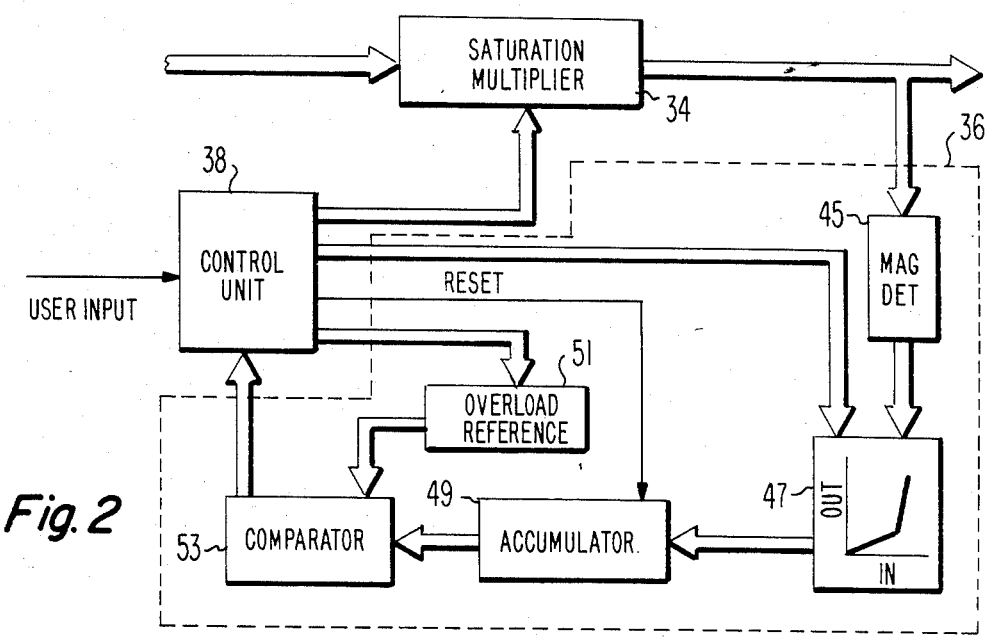
FIGS. 2 and 5 are block diagrams of signal overload control circuits which may be employed in the FIG. 1 circuit.

FIG. 2 shows the overload detector in greater detail. Assume that the input to saturation multiplier 34 is a nondemodulated chrominance signal. This signal is a phase and amplitude modulated sinusoid, and as a result the magnitude of the digital representations of the signal will vary according to the instantaneous sampling phase. Assume also that the sample rate is at four times the color subcarrier rate, rendering alternate successive samples in quadrature relation. The quantity of interest for overload adjustment is the magnitude or peak-to-peak swing of the chrominance signal, and not the value of successive samples. Therefore, it is necessary to first detect the magnitude of the chrominance signal. This function is performed by element 45 coupled to the output connection of multiplier 34. Element 45 may perform the function of calculating the square root of the sum of the squares of successive pairs of adjacent samples to determine the magnitude. Alternatively, it may be a device which estimates the magnitude, etc. Note also that since the overall function is in general designed to limit the maximum values of the chrominance signal it may not be necessary to involve the lesser significant bits of the samples in the magnitude calculation.

The magnitude samples are applied to a signal weighting element 47 which has a piecewise linear transfer function. This transfer function is a two slope function and is designed to weight larger amplitude signals more heavily than smaller amplitude signals. The shape of the transfer function is a coarse equivalent to a diode or transistor base-emitter transfer characteristic of the type used in analog overload detectors.

Weighted magnitude values from element 47 are applied to accumulator 49 which sums the weighted values or which counts the number of times the values exceed a predetermined value, during a predetermined time interval, e.g. a field or a frame period. The accumulated or integrated value produced by element 49 is applied as one input signal to the comparator 53. An overload reference value from storage element 51 is applied as a second input signal to comparator 53. If the accumulated value exceeds the reference value, the comparator provides a signal to control unit 38 indicating that the multiplying factor applied to multiplier 34 should be reduced. The comparator may be arranged to indicate the difference value per se, which value is an indication of the percent change required of the multiplying factor. Alternatively, the comparator may be arranged to indicate only the polarity of the difference. In the latter case the control unit is programmed to increment or decrement the multiplying factor by a fixed amount for each time interval that the comparator provides the signal.

If the control unit 38 is, for example, a microprocessor, it will readily be appreciated that elements 51 and 53 may be incorporated therein via appropriate software programming.

Consider that the system is operating in the steady state and the user attempts to increase the reproduced image color saturation, i.e. he increases the user controlled contribution to the saturation multiplication factor. If nothing else is altered, the magnitude of the signal at the output of multiplier 34 and detector 45 will be increased as well as the accumulated value output by accumulator 49. This latter enhanced value will tend to cause the control unit 38 to counteract the user directed saturation increase, in effect defeating the saturation control. (As noted earlier, this problem does not occur where the detector input is coupled ahead of the multiplier.) To overcome the self defeating aspect of the overload protection-saturation multiplier apparatus, the transfer function of weighting element 47 is altered simultaneously with user controlled saturation changes. For larger saturation settings, the weighting circuit is programmed to be less responsive to a greater percentage of applied signals and vice versa.

Figure 3:
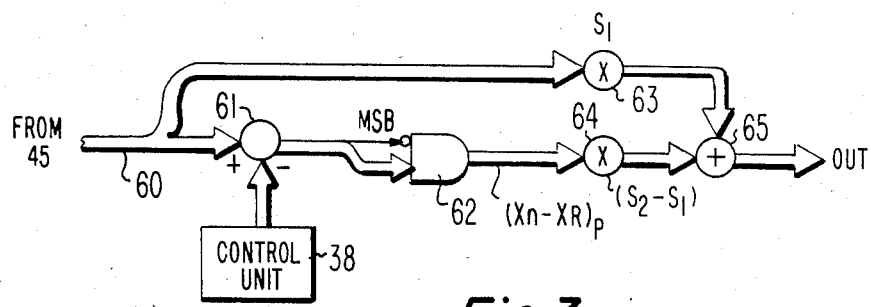
FIG. 3 is a logic diagram of a piecewise linear weighting circuit which may be substituted for the FIG. 2 signal overload control circuit.
Figure 4:
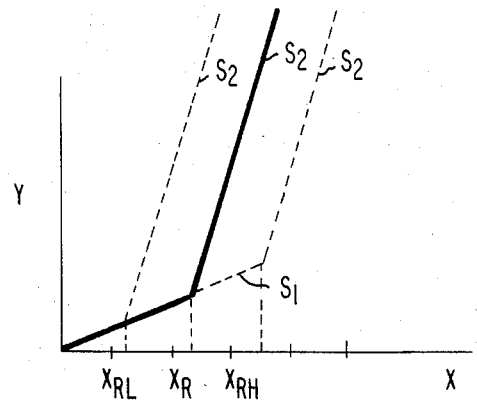
FIG. 4 is a graphical representation of the transfer characteristic of the FIG. 3 circuit.

Consider the detector weighting circuit of FIG. 3 and its response curves shown in FIG. 4. The response is a two slope response including a lower valued slope from zero to the knee (i.e. the intersection of the slopes) and a higher valued slope for input values beyond the knee. The smaller and larger slopes may be, for example, one-half and four and one-half respectively, and the knee located at the value $X_R$ on the abscissa. Applied chrominance signal magnitude values from element 45 having values less than the value $X_R$ are multiplied by the factor one-half and magnitude values larger than the value $X_R$ are multiplied by a factor of four and one-half. The overall detector is thus much more sensitive to signals of higher magnitude. The effect is to prevent small highly saturated image areas from appearing unnaturally intense or vivid.

The programmability feature of the weighting element is provided by varying the position or value of the knee. (This change will normally be accompanied by a simultaneous change of the overload reference.) As the knee is moved to a lower value, $X_{RL}$, a larger percentage of applied values are weighted by the value corresponding to the greater slope. As the knee is extended rightward to a higher value, $X_{RH}$, fewer samples of the applied signal are large enough to be affected by the greater slope value.

Let $X_n$ be equal to the $n^{th}$ magnitude sample applied to the weighting circuit and $Y_n$ be the $n^{th}$ weighted sample produced by the weighting circuit 47. The value of $Y_n$ may be described $$Y_n = S1 X_n + (S2-S1)(X_n-X_R)_P \qquad (1)$$

where S1 and S2 represent the values of the lesser and greater slopes of the element 47 transfer function and the quantity $(X_n-X_R)_P$ is nonzero only for positive differences, $X_n-X_R$. Thus, the term $(S2-S1)(X_n-X_R)_P$ is zero for negative and zero values of $X_n-X_R$. Assume that for a knee value of $X_R$ that the overload reference is $R_R$. The accumulator 49 output, $O_A$, may be represented by the sum over a field period as $$O_A = \overset{\text{field}}{\Sigma} Y_n \qquad (2)$$

and the comparator 53 output, Co, by the difference $$Co = O_A - R_R. \qquad (3)$$

Consider next that the user increases the user input to the saturation gain by a factor of M. This tends to cause the magnitudes $X_n'$ for the same image signal to be M times the original magnitudes, i.e.

$$X_n' = M X_n. \qquad (4)$$

When the user input of the saturation gain is changed by the factor M, the control unit changes the knee of the transfer function M times the original knee value of $X_R$. The control unit 38 also changes the overload reference to a new value, $R_R'$ equal to M times the original reference value $R_R$. Assuming a multiplier gain change, the new values $Y_n'$ produced by element 47 are given by $$Y_n' = S1 X_n' + (S2-S1)(X_n'-X_R')_P \qquad (5)$$
$$= S1 M X_n + (S2-S1)(M X_n - M X_R)_P \qquad (6)$$
$$Y_n' = M Y_n. \qquad (7)$$

or $$Y_n' = M Y_n. \qquad (7)$$

The values $O_A'$ output by the accumulator 49 are equal to $$O_A' = \Sigma Y_n' = M \Sigma Y_n \qquad (8)$$

and the new values Co' output by the comparator 53 are $$\begin{aligned} Co' &= O_A' - R_R' & (9) \\ &= \Sigma Y_n' - R_R' & (10) \\ &= M(\Sigma Y_n - R_R) & (11) \\ &= M Co. & (12) \end{aligned}$$

Thus, the loop will stabilize at M times the magnitude values at which it stabilized before the saturation factor was increased.

FIG. 3 illustrates an exemplary programmable weighting circuit having the transfer characteristic illustrated in FIG. 4. In the circuit, magnitude values from the magnitude detector 45 are applied to the input port 60. These values are applied as minuends to subtractor circuit 61. Knee values from the control unit 38 are applied as subtrahends to subtractor circuit 61 which produces the values $(X_n-X_R)$. The most significant or sign bit of these differences is applied to an inverting input terminal of AND gate 62 and the remaining value bits are applied to noninverting input terminals of AND gate 62. Since we assumed that the processing was to be performed with two's complement samples, the MSB of the differences $X_n-X_R$ is zero or a logic low for positive differences and a one or a logic high for negative differences. As such, AND gate 62 will only pass differences $(X_n-X_R)_P$ greater than zero, and will pass a zero value for differences less than or equal to zero. AND gate 62 may be realized by a plurality of two input AND gates, one for each value bit of the difference sample. Each of the plurality of AND gates has an inverting input coupled to the sign bit of the difference sample and respective non-inverting second inputs coupled to respective ones of the value bits of the difference samples.

Difference values from AND gate 62 are applied to multiplier circuit 64 which multiplies the differences by the difference of the two slopes (S2−S1). If S1 equals one-half and S2 equals four and one-half, (S2−S1) equals 4 which is a multiple of two. In this instance multiplier 64 may be reduced to a wired bit shift left element requiring no circuit components. Output values from multiplier 64 are applied to one input port of the adder circuit 65.

Magnitude samples at input port 60 are also applied to the second multiplier circuit 63. Multiplier circuit 63 scales the magnitude samples $X_n$ by the slope factor S1. Choosing S1 equal to one-half permits realization of circuit 63 with a hard wired bit shift right element also requiring no components.

Output values from multiplier 63 are applied to a second input port of adder 65. Adder 65 produces output values equal to $Y_n$. (Note it can be readily shown that equation (1) defining the values $Y_n$ describes the FIG. 4 transfer function.)

Moving the knee or programming the FIG. 3 apparatus requires no more than a simple change of the knee value applied to subtractor element 61. The control unit is programmed with a set of parameters corresponding to the knee value, a saturation value and an overload reference value for a predetermined operating point. Each time the saturation value is changed by the user, the control unit calculates new knee and overload reference values, in proportion to the saturation change, from the stored set of parameters, and applies them to the circuitry. Once the desired saturation level is established, the saturation value applied to the saturation multiplier is changed on a picture-by-picture or field-by-field basis according to the comparator output response. If the comparator output is positive or negative, the saturation multiplier is automatically reduced or increased respectively by the control unit to tend to reduce the comparator output to zero.

Figure 5:
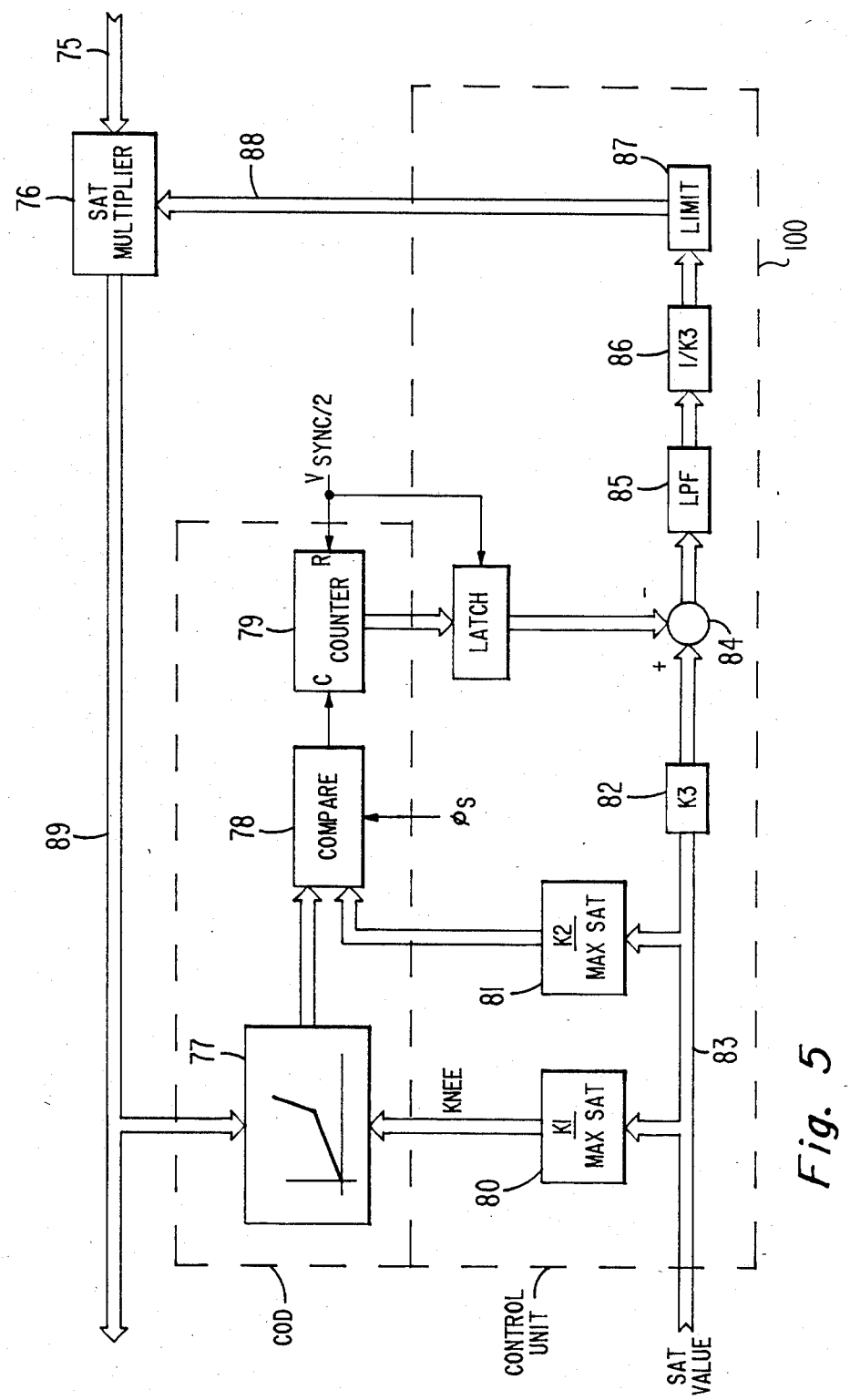

FIG. 5 illustrates a further embodiment of a COD system. Chrominance signal which may be undemodulated chrominance or one of the demodulated color difference signals is applied at the input port 75 of the saturation multiplier 76. Combined saturation-COD gain control signals are applied to the gain control input port of multiplier 76 via signal bus 88. Gain controlled chrominance signal from multiplier 76 is output on bus 89. User generated saturation control signals are applied to the FIG. 5 circuitry via bus 83.

Saturation control values are applied to first and second scaling circuits 80 and 81. Scaling circuit 80 generates knee values for the piecewise linear weighting circuit 77. Scaling circuit 80 multiplies the saturation signal by the factor $K_1$/MaxSat where $K_1$ is the maximum usable knee value and MaxSat is the maximum usable saturation value. Thus, when the applied saturation value is equal to the value MaxSat, the knee value applied to circuit 77 will be $K_1$. All other knee values will be proportioned to the currently applied saturation value.

Output chrominance signal on bus 89 is applied to the signal input port of weighting circuit 77. Circuit 77 is of the type illustrated in FIG. 3. Weighted chrominance samples from circuit 77 are applied to a first input port of comparator 78.

Scaling circuit 81 generates the overload reference value which is applied to a second input port of comparator 78. Scaling circuit 81 multiplies the saturation value by the factor $K_2$/MaxSat where $K_2$ corresponds to the overload reference value, MaxRef, appropriate when the saturation value equals MaxSat and the applied knee value is $K_1$. Circuit 81 responsive to the saturation value generates overload reference values in proportion to the current saturation value.

Comparator 78 produces a bilevel output signal having non-zero and zero logic states for the weighted chrominance samples being greater or lesser than the overload reference value respectively. Comparator 78 is clocked at the sample rate by clock signal $\phi s$ to provide a return to zero output signal after each sample comparison. Each weighted chrominance sample which is greater than the reference value thus produces a pulse at the comparator 78 output terminal.

Output pulses from comparator 78 are applied to counter circuit 79 which counts the number of pulses occurring in e.g. one frame period. The output count of the number of pulses occurring in the current frame period is stored in the latch 90 responsive to the clock signal Vsync/2 which is synchronized with the vertical synchronization pulse. Simultaneously the counter 79 is reset to zero in preparation for counting the overload pulses in the subsequent frame.

Saturation values on bus 83 are scaled in element 82 by the factor $K_3$ equal to the loop gain constant. The overload count stored in latch 90 is subtracted from the scaled saturation value in subtractor 84 and the differences are low pass filtered in element 85. Low pass filter 85 has a time constant at least as long as a frame period. Signal from low pass filter 85 is divided by the loop gain $K_3$ in element 86 and applied to limiter 87 which limits the largest signal samples to the value of MaxSat. The output of limiter 87 is applied as the gain input to multiplier 76 via bus 88. Note that all of the elements circumscribed by line 100 may be subsumed in a microprocessor device.

We claim:

1. Video signal processing apparatus for controlling the amplitude of a digital video signal comprising:
   a source of digital video signal;
   a multiplier having a signal input port coupled to said source, having an output port at which amplitude controlled signal is available, and having a control input port;
   a detector responsive to the magnitudes of said digital video signals for generating a control signal, said detector including a piecewise linear weighting means providing said detector with a first level of sensitivity to signal magnitudes less than a predetermined value and a second level of sensitivity to signal magnitudes above said predetermined value; and
   means for coupling said control signal to said control input terminal.

2. The apparatus set forth in claim 1 wherein said weighting means is characterized by a two slope transfer function, the intersection of said slopes being defined by a knee value, said weighting means comprising:
   a source of said knee value;
   means for producing the differences of said digital video signal magnitude and said knee value;
   means responsive to said differences for passing only positive ones of said differences;
   means for multiplying said positive differences by a first factor related to one of said slopes;
   means for multiplying said digital video signal magnitudes by a second factor related to the other of said slopes; and
   means for combining the multiplied differences and the multiplied magnitudes to produce weighted digital video signal magnitude values.

3. The apparatus set forth in claim 2 wherein said detector further includes means for supplying alternate knee values.

4. The apparatus set forth in claim 2 wherein the detector further includes:
   an accumulator responsive to said weighted digital video signal magnitude values for generating a signal corresponding to the sum of said values over a predetermined period;
   a source of overload reference value; and
   a comparator for comparing the signal from said accumulator against said overload reference value.

5. The apparatus set forth in claim 4 wherein the means for coupling said control signal to the control input terminal comprises:
   a control unit including a source of user input signal for providing a user determined gain value for application to said control input terminal, said control unit being programmed to alter said user determined gain value responsive to the control signal provided by said comparator.

6. The apparatus set forth in claim 5 wherein said detector is coupled to the output port of said multiplier and said control unit is responsive to changes of user input signal from said source of user input signal to alter the knee value and said overload reference value.

7. The apparatus set forth in claim 6 wherein said control unit is programmed to alter the knee and overload reference values proportional to said changes in user input signal.

8. The apparatus set forth in claim 1 wherein said multiplier is a chrominance signal saturation gain multiplier.

9. The apparatus set forth in claim 2 wherein the detector further includes:
   a source of overload reference value;
   a comparator for comparing the overload reference value to said weighted digital video signal values, said comparator producing an output pulse for each weighted digital video signal sample exceeding said overload reference video; and
   means for counting the number of said output pulses occurring during said predetermined period, the number of pulses corresponding to said control signal.

10. The apparatus set forth in claim 9 wherein the means for coupling said control signal to the control input terminal comprises:
    a control unit including a source of user input signal for providing a user determined gain value for application to said control input terminal, said control unit being programmed to alter said user determined gain value responsive to the control signal provided by said counting means.

11. The apparatus set forth in claim 10 wherein said detector is coupled to the output port of said multiplier and said control unit is responsive to changes of user input signal from said source of user input signal to alter the knee value and said overload reference value.

12. The apparatus set forth in claim 11 wherein said control unit is programmed to alter the knee and overload reference values proportional to said changes in user input signal.

13. In apparatus for processing a digital video signal, a detector for generating a control signal related to the amplitude of said digital video signal over a predetermined time interval, said detector comprising:
    means for applying a digital video signal;
    a source of first and second reference values;
    means for producing the difference values of said digital video signal values and said first reference value;
    means responsive to said difference values for passing the difference values of one polarity only;
    means responsive to said one polarity difference values for scaling said one polarity difference values by a first constant value;
    means responsive to said digital video signal for scaling this signal by a second constant value;
    means for combining the scaled digital video signal and the scaled one polarity difference values to produce a weighted digital video signal wherein signal values less than said first reference value are weighted differently than signal values greater than said first reference value;
    means including means for comparing said weighted digital video signal with said second reference value, to produce said control signal, said control signal having a value corresponding to the number of samples which exceed the second reference value over said predetermined time interval.

14. Apparatus for controlling the magnitude of the chrominance component of digital video signals in a video signal processing system, said apparatus comprising:
    a source of said chrominance components;
    a saturation multiplier coupled to said source, having a saturation control input port and having an output port;
    a detector coupled to the outport port of said saturation multiplier for generating a magnitude control signal, said detector weighting signal samples from said multiplier output port by first and second weighting factors depending upon the magnitude of the signal sample being lesser or greater than a reference value respectively;
    a source of saturation control signal;
    a control unit responsive to said saturation control signal and said magnitude control signal for providing a combined control signal to the saturation control input port of said saturation multiplier, said control unit further providing said reference value proportioned to said saturation control signal.

* * * * *